…

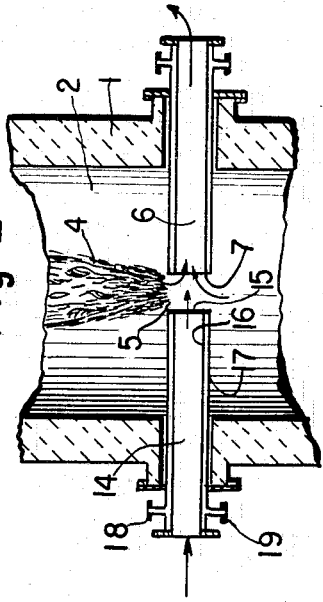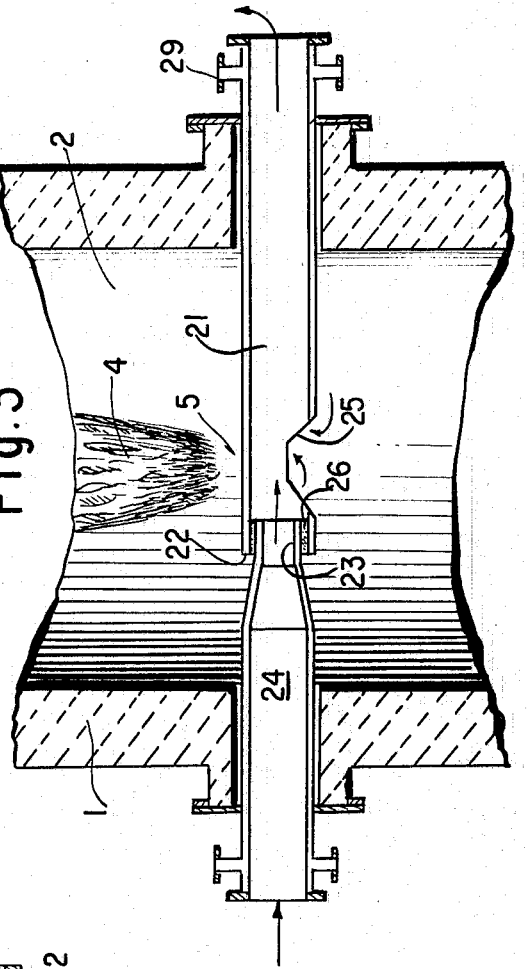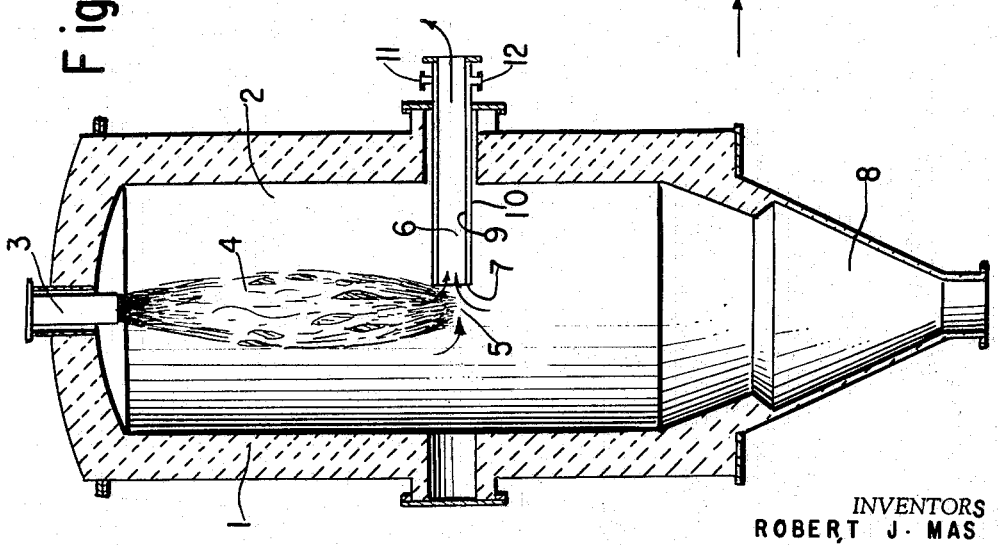

United States Patent Office 3,357,794
Patented Dec. 12, 1967

3,357,794
PROCESS AND APPARATUS FOR CONTINUOUSLY PRODUCING TITANIUM DIOXIDE BY THE OXIDATION OF VAPORIZED TITANIUM TETRACHLORIDE
Robert J. Mas, Thann, and André L. Michaud, Vieux-Thann, France, assignors to Fabriques de Produits Chimiques de Thann et de Mulhouse, Thann, Haut-Rhin, France, a corporation of France
Filed July 25, 1962, Ser. No. 222,984
Claims priority, application France, July 29, 1961, 869,475
13 Claims. (Cl. 23—202)

This invention relates to a process and to apparatus for continuously producing titanium dioxide, $TiO_2$, by the oxidation of vaporized titanium tetrachloride, $TiCl_4$. It provides new and useful improvements whereby valuable continuity and control of the production are attained and the pigment product is obtained with improved properties.

It is known that when vaporized titanium tetrachloride is reacted at a sufficiently high temperature with gases containing oxygen, the reaction produces, with a practically complete conversion, titanium dioxide suspended in hot reaction gases containing chlorine.

Several methods have been described for carrying out the reaction with the production of a flame. According to one method, the gases to be reacted are separately preheated to a temperature high enough to initiate the reaction and then are mixed together in the furnace. According to another method, a mixture of vaporized titanium tetrachloride and oxygen is maintained in a flaming state by the heat of an auxiliary flame produced in the furnace by burning a combustible gas such as carbon monoxide with oxygen.

In any case, the apparatus in which the reaction takes place comprises necessarily a reaction chamber, one or a plurality of pipes or burners feeding the inflowing reactant gases, and offtake means for the removal of the hot suspension of titanium dioxide in the gases produced by the reaction (burned gases).

The suspension of $TiO_2$ in the burned gases is usually removed from the reaction chamber and rapidly cooled to a temperature lower than 600° C. The $TiO_2$ is then separated from the cooled gases by conventional means, such as electrostatic separators, filtration through porous surfaces, etc.

In plant operations, the cooling of the reaction products is essential not only for the recovery of the pigments produced but also for lowering the temperature of the gases to a level at which their corrosive action on the equipment contacted by the suspension is tolerable. The corrosive action of the gases increases rapidly with increases of their temperature.

In all the known practices, the suspension of the metallic oxide in the burned gases leaves the furnace through one or more orifices maintained at a high temperature by the heat of the reaction. As the operations continue deposits or crusts of adhering crystals of $TiO_2$ accumulate not only on the exit orifices themselves but also on the surrounding walls of the reaction chamber.

It has been suggested for preventing these crusts, or reducing them, to resort to scrapers, chemical cleaning, protection by a fluid envelope of gases, etc. With all such techniques, however, it is impossible to avoid either contamination of the pigments produced or interruption of the production for cleaning purposes, which results in losses of the desired product or of production time and volume.

It has been observed that the building up of strongly adhering deposits may be prevented during a relatively short period of time by keeping the walls of the furnace chamber at temperatures lower than that at which the reaction proceeds. This technique, however, does not prevent the formation of a layer of isolating oxides, and the accumulation of obstructive oxide crusts or deposits unavoidably takes place sooner or later.

The present invention aims to avoid the above-mentioned and other difficulties of the production techniques heretofore known.

A principal object of the invention is to provide a process and apparatus for carrying out the process, by which the hot suspension of $TiO_2$ in chlorine containing burned gases is continuously formed in and removed from the reaction chamber without bringing about the obstructive accumulation of oxide crusts and with little corrosive action in the chamber or at the offtake orifice or orifices.

Another important object of the invention is to provide a process and apparatus whereby the reaction of the vaporized $TiCl_4$ is effected continuously in a flame kept burning steadily without objectionable disturbance by whirls or backflow and the $TiO_2$ product is obtained with a more regular and better particle size and texture than in prior practices.

According to this invention, the titanium dioxide is produced by the reaction of vaporized titanium tetrachloride with oxygen in a furnace chamber in any of the ways whereby a flame yielding a hot suspension of $TiO_2$ in chlorine containing burned gases may be maintained continuously in the furnace, and as the suspension is formed it is removed continuously from the furnace chamber by evacuation from a central zone of the chamber remote from the hot walls thereof. At the same time the surfaces by which the suspension is collected and evacuated are cooled to keep them at a temperature at which oxide crusts will not accumulate on them.

In this way, the $TiO_2$ suspension is formed under favorable reaction conditions and then is removed immediately from the reaction environment without causing adherent crusts to accumulate on the pipings and walls of the furnace chamber.

According to a further aspect of the invention, cooled burned gases separated from preformed products of the process are continuously recycled into the furnace chamber and mixed at the same central zone thereof with the hot $TiO_2$ suspension as the latter is being evacuated from the chamber, so that the suspension is evacuated as a part of the resulting mixture at an abruptly reduced temperature. It has been found that in this way, notwithstanding the recycling of cooled burned gases into the chamber, a smooth, steady combustion of the $TiCl_4$ can be maintained and pigments of improved quality can be produced, again without the accumulation of troublesome adherent crusts on the pipings and walls of the furnace.

In the practice of the invention with the recycling or cooled burned gases, these gases may be passed in contact with the hot suspension as the latter is produced by the reaction and then removed with the suspension from the reaction chamber by a suction whereby a regulated circulation of the gases is maintained in the evacuation piping.

According to one embodiment of such practice, intake and offtake conduits are arranged with open ends in alignment but spaced apart by a limited distance at the central zone of the chamber, so that as the cooled burned gases pass under suction to an offtake conduit from an intake conduit they entrain the hot suspension in the interspace and are sucked with the suspension through the offtake conduit.

According to another embodiment, intake and offtake conduits are interconnected and provided at the central zone of the reaction chamber with an orifice or orifices through which the hot suspension is evacuated by the suction-induced circulation of the cooled burned gases.

The conduits advantageously are arranged with an end portion of an intake conduit extending into an end of an offtake conduit and forming with the latter a venturi whereby the suspension is effectively collected, mixed with the cooled gases and removed with the latter through the offtake or suction conduit.

Other objects, features and advantages of the invention will be apparent from the following more detailed description and the accompanying drawing of illustrative embodiments thereof. In the drawing:

FIG. 1 is a schematic vertical cross-section of an oxidation furnace provided according to the invention;

FIG. 2 is a fragmentary schematic view of another embodiment thereof; and

FIG. 3 is a fragmentary schematic view of a third embodiment thereof in which the intake and offtake conduits form a venturi effecting the evacuation of the $TiO_2$ suspension.

FIG. 1 illustrates a simple embodiment of the invention in a furnace equipped for the oxidation of vaporized $TiCl_4$ and the evacuation of the hot gaseous suspension formed by the reaction without the recycling of cooled burned gases.

The furnace shown includes a massive, vertically elongated, heat-insulating wall structure 1 defining a vertically elongated cylindrical reaction chamber 2. Mounted in the top wall of the structure at the upper end of the reaction chamber is a burner or pipe system 3 of any suitable construction, from which a downwardly streaming flame 4 of vaporized $TiCl_4$ reacting with oxygen is maintained in chamber 2 along the axis of the chamber.

The burner 3 may be of a known type that maintains a flaming reaction of a pre-formed mixture of vaporized $TiCl_4$ and oxygen within a flame of carbon monoxide, e.g., in accordance with U.S. Patent No. 2,823,982; or it may be of a known type adapted for the reaction of a highly pre-heated stream of vaporized $TiCl_4$ with a highly pre-heated stream of oxygen containing gas, e.g., in accordance with British Patent No. 541,343.

In either case, a hot suspension of $TiO_2$ in chlorine containing burned gases is formed continuously in the flame zone indicated schematically at 4, and this suspension passes continuously downwardly into a central zone 5 of the reaction chamber near the end of the flame.

An offtake conduit 6 is arranged to extend out of the furnace from a location adjacent to the central zone 5, where the open end 7 of this conduit will collect the hot suspension as it is formed and delivered from the flame. While a single offtake conduit is shown in the drawing, it will be understood that any desired number of similar conduits may be provided.

The conduit 6 is connected outside the furnace through a suitable piping with an exhauster such as a vacuum pump (not shown), by which a reduced pressure or partial vacuum is continuously maintained in the conduit. This partial vacuum sucks gases into the open end 7 of the conduit from the central zone 5 of the reaction chamber and thus continuously evacuates the hot $TiO_2$ suspension from the reaction chamber as the suspension is formed therein.

To the extent that the reaction products contain relatively coarse oxide particles tending to settle out of the burned gases, these particles flow downwardly past the open end of the horizontally disposed offtake or evacuation conduit and fall out of the suspension into a sump 8 in the lower part of the furnace structure. The coarse particles may be removed continuously from the sump or may be allowed to accumulate in it and removed from time to time, as desired.

The offtake conduit 6 is cooled continuously so as to keep its surfaces contacted by the products formed in the reaction chamber at a relatively low temperature. Their temperature is always kept well below 600° C. The suspension is thus cooled in the conduit as it is evacuated, and the surfaces by which it is evacuated are kept at a temperature at which obstructive oxide crusts will not accumulate on them. To this end, the conduit 6 advantageously is made of a pipe 9 of corrosion-resistant heat-conductive sheet metal, such as aluminum or an aluminum alloy, encompassed in a fluid-tight jacket 10 of similar sheet metal, and fittings 11 and 12 are provided on the jacket outside the furnace wall 1 for the continuous circulation of a cooling fluid, such as water or another suitable liquid, throughout the jacket 10 in the space between it and pipe 9.

A simple embodiment of the invention such as illustrated in FIG. 1 operates with several important advantages. The hot suspension of $TiO_2$ in chlorine containing burned gases never comes into contact with the walls of the furnace but is removed continuously from the central zone of the reaction chamber as it is formed. Since the removal is effected by evacuation from a zone near the end of the flame, the flame burns steadily without disturbance by whirls, and the oxidation reaction proceeds smoothly in a way enabling improved control of the quality and uniformity of the pigment produced. Moreover, by virtue of the desired manner of removal and cooling, the formation of crusts which heretofore have caused plugging of the openings of $TiCl_4$ oxidation furnaces is effectively prevented.

According to the embodiment illustrated in FIG. 2, the furnace has the same general arrangement as that of FIG. 1 but is provided with one or more additional conduits 14, each aligned with an offtake or suction conduit, such as the conduit 6 above described, for conducting cooled burned gases separated from pre-formed products of the process into the central zone 5 of the reaction chamber and thence with the hot suspension into and through the coacting offtake or suction conduit.

As shown, an intake conduit 14 extends horizontally through the furnace wall 1 at a location opposite to conduit 6 and terminates in an open end 15 spaced from the open end 7 of conduit 6 in horizontal alignment with the latter. The open ends advantageously are disposed at opposite sides of the central zone 5, or of the direction of the flame approaching that zone, and spaced apart by a distance smaller than the diameter of the offtake conduit. For example, the spacing may be about half the diameter.

The intake conduit is also equipped with means for keeping it cooled so as to prevent the accumulation of oxide crusts on its surfaces contacted by the reaction products and to cool the gases circulated in it. Like conduit 6, it may be made of a pipe 16 of corrosion-resistant heat-conductive sheet metal, such as aluminum or an aluminum alloy, encompassed in a fluid-tight jacket 17 of similar sheet metal on which fittings 18 and 19 are provided outside the furnace wall for the continuous circulation of a cooling fluid, such as water or another suitable liquid, throughout the jacket 17 between it and the pipe 16.

In the practice of the invention according to the embodiment of FIG. 2, the hot suspension of $TiO_2$ in chlorine containing burned gases passes from the flame 4 into and about the space in central zone 5 between the open ends of the conduits 6 and 14, where the suspension is collected and swept away in the offtake or suction conduit 6 by the flow of the cooled burned gases which are continuously passed into the central zone through intake conduit 14 and are continuously taken into conduit 6 in admixture with the hot suspension by the suction maintained in the offtake conduit.

By this practice the several advantages of the simpler embodiment first described are fully realized, together with further advantages in that the hot suspension formed in the furnace is diluted and cooled abruptly by the entrainment and admixture thereof with the recycled cooled burned gases as it is evacuated from the central zone of the reaction chamber. In this way a better control of the particle size of the $TiO_2$ product is maintained, and the titanium dioxide is recovered with an unusually good texture and uniformity.

It has been found that in this manner the hot suspension of $TiO_2$ in burned gases can be mixed as it is formed with the desired quantity of cooled recycled gases and removed wtih the latter from the reaction chamber without any detrimental effect upon or disturbance of the reaction conditions or the flame in which the oxidation takes place, and without any plugging of the offtake opening or openings by crusts or deposits of titanium dioxide. No formation or accumulation of adherent crusts occurs on the cooled metal surfaces of the conduits, and any deposits settling thereon, as on the upper side of an outer surface thereof, are easily removed by a light scraping operation.

According to another and an especially advantageous embodiment of the invention, as illustrated in FIG. 3, the general arrangement of the oxidation furnace may be similar to that of FIG. 1 or FIG. 2, but intake and offtake conduits meeting at a central zone of the reaction chamber are interconnected so as to form a venturi by which the hot suspension is evacuated from the chamber and mixed with recycled cooled burned gases in the course of the evacuation.

As shown in FIG. 3, an offtake conduit 21 is connected outside the furnace wall 1 with suitable suction means (not shown) and extends in the furnace chamber through central zone 5 thereof. The end 22 of this conduit receives in telescoped relation a reduced end portion 23 of an intake conduit 24. The intake conduit conducts cooled burned gases into the furnace, and as these gases are sucked from its end portion 23 of reduced diameter into the conduit 21 their velocity is increased and a venturi effect is exerted at an opening 25 formed in conduit 21. The hot suspension continuously entering the central zone 5 from the flame 4 thus is sucked into opening 25 and then mixed and carried away with the recycled cooled gases in conduit 21. The recycled cooled gases thus collect, cool, dilute and remove the desired reaction products, but without having access to or undergoing any substantial free flow in the reaction space proper of the furnace.

The opening 25 formed in the offtake conduit may have any of various shapes, such as round, oval, frusto-conical or beveled. It preferably is located in the side of the conduit opposite to the side thereof exposed to the flame, so as to minimize undesirable heating of the recycled gases passing through the furnace.

The end 22 of conduit 21 in this embodiment receives the reduced end portion 23 of conduit 24 with an intervening space 26, which may contain a suitable packing, whereby play is provided for the thermal dilation of these metallic elements of the apparatus.

The conduits 21 and 24, like the conduits of the embodiments previously described, are preferably water-jacketed pipes of aluminum or an aluminum alloy so constructed that all their surfaces exposed to the reaction environment are cooled continuously. It has been found, surprisingly, that conduits of such cooled metal construction give prolonged satisfactory service under the severe conditions of corrosion and high temperature to which they are exposed in the reaction chamber. The aluminum-magnesium alloy known as AG3 is one example of a material suitable for the construction of the conduits.

As previously indicated, one of the main advantages of the present invention is that by the evacuation of the hot suspension of $TiO_2$ in chlorine containing burned gases in contact with cooled surfaces, from a central zone of the reaction chamber remote from the hot walls thereof, no crusts of titanium dioxide form or accumulate at the critical places where they generally occur, such as at the openings of the furnace or the furnace walls close to the openings.

In addition, other important advantages are achieved according to the invention, among them being that the titanium dioxide produced is composed of particles of unusually uniform size, having an extraordinarily narrow range of distribution or variation of the particle sizes. This results from the fact that the flame maintained in the furnace is perfectly stable and that the streams of the gases therein flow without vortex or backflow, so that the reaction is steady both in space and in time.

While the invention has been described with reference to numerous particulars of illustrative embodiments, it will be evident that it may be practiced in various other ways without restriction to such particulars except as may be required by a fair construction of the appended claims.

What is claimed is:

1. In the production of titanium dioxide by the reaction of vaporized titanium tetrachloride with oxygen in a furnace chamber, whereby a hot suspension of $TiO_2$ in chlorine containing burned gases is formed continuously in said chamber, the process which comprises continuously evacuating said suspension as it is formed from a central zone of said chamber remote from the hot walls thereof and near the end of the zone of said reaction and continuously cooling the surfaces within said chamber by which the suspension is evacuated to keep the same at a temperature at which crusts of the $TiO_2$ will not accumulate thereon.

2. In the production of titanium dioxide by the reaction of vaporized titanium tetrachloride with oxygen in a furnace chamber, whereby a hot suspension of $TiO_2$ in chlorine containing burned gases is formed continuously in said chamber, the process which comprises continuously evacuating said suspension as it is formed from a central zone of said chamber remote from the hot walls thereof and near the end of the zone of said reaction, and continuously recycling into said chamber and mixing and evacuating with the suspension at said central zone cooled burned gases separated from pre-formed products of the process.

3. In the production of titanium dioxide by the reaction of vaporized titanium tetrachloride with oxygen in a streaming flame burning continuously in a furnace chamber, whereby a hot suspension of $TiO_2$ in chlorine containing burned gases is formed continuously in said chamber, continuously collecting said suspension and evacuating it in a direction transverse to that of said flame from a central zone of said chamber remote from the hot walls thereof and near the end of said flame, and continuously cooling the surfaces within said chamber by which the suspension is collected and evacuated to keep the same at a temperature at which crusts of the $TiO_2$ will not accumulate thereon.

4. In the production of titanium dioxide by the reaction of vaporized titanium tetrachloride with oxygen in a streaming flame burning continuously in a furnace chamber, whereby a hot suspension of $TiO_2$ in chlorine containing burned gases is formed continuously in said chamber, continuously collecting said suspension and evacuating it in a direction transverse to that of said flame from a central zone of said chamber remote from the hot walls thereof and near the end of said flame, passing from said flame through and beyond said zone for delivery separately from said chamber coarse oxide particles not entrained in the evacuated suspension, and continuously cooling the surfaces within said chamber by which the suspension is collected and evacuated to keep the same at a temperature at which crusts of the $TiO_2$ will not accumulate thereon.

5. In the production of titanium dioxide by the reaction of vaporized titanium tetrachloride with oxygen in a furnace chamber, whereby a hot suspension of $TiO_2$ in chlorine containing burned gases is formed continuously in said chamber, the process which comprises continuously collecting and evacuating said suspension from a central zone of said chamber remote from the hot walls thereof and near the end of the zone of said reaction in conduit means extending from said central zone out of said chamber, continuously conducting into said chamber and mixing at said central zone with the suspension there being collected cooled burned gases separated from preformed products of the process, and continuously sucking the resulting mixture out of said chamber through said conduit means.

6. Apparatus for the production of titanium dioxide, comprising a heat-insulating reaction chamber, burner means for continuously maintaining in said chamber a reaction of vaporized titanium tetrachloride reacting with oxygen to form a hot suspension of $TiO_2$ in chlorine containing burned gases, offtake means including a conduit opening at a central zone of said chamber remote from the heat-insulating walls thereof and near the end of the zone of said reaction, and extending from said central zone out of said chamber for collecting and evacuating said suspension as it is formed, and means acting directly upon at least the portion of said conduit within said chamber for continuously cooling the surfaces of said conduit within said chamber to keep the same at a temperature below 600° C. at which crusts of the $TiO_2$ will not accumulate thereon.

7. Apparatus according to claim 6, said conduit comprising within said chamber a pipe encompassed by a fluid-tight jacket and means for circulating a cooling fluid through said jacket.

8. Apparatus according to claim 6, said conduit comprising within said chamber an aluminum pipe encompassed by a fluid-tight aluminum jacket and means for circulating a cooling fluid through said jacket.

9. Apparatus for the production of titanium chloride, comprising a vertically elongated heat-insulating reaction chamber, burner means at the upper end of said chamber for continuously maintaining therein a downwardly streaming flame of vaporized titanium tetrachloride reacting with oxygen to form a hot suspension of $TiO_2$ in chlorine containing burned gases, offtake means including a conduit opening at a central zone of said chamber remote from the heat-insulating walls thereof and near the end of the flame zone thereof for collecting and evacuating said suspension as it is formed, said conduit extending horizontally away from said central zone and out of said chamber, and means acting directly upon at least the portion of said conduit within said chamber for continuously cooling the surfaces of said conduit within said chamber to keep the same at a temperature below 600° C. at which crusts of the $TiO_2$ will not accumulate thereon.

10. Apparatus for the production of titanium dioxide, comprising a heat-insulating reaction chamber, burner means for continuously maintaining in said chamber a flame of vaporized titanium tetrachloride reacting with oxygen to form a hot suspension of $TiO_2$ in chlorine containing burned gases, suction offtake means including a conduit opening at a central zone of said chamber remote from the heat-insulating walls thereof and extending from said zone out of said chamber for collecting and evacuating said suspension as it is formed, and intake means including a conduit extending into said chamber to said central zone and there aligned with said offtake conduit for conducting cooled burned gases separated from preformed products of the reaction into admixture with the suspension being collected by said offtake conduit and then out of said chamber with said suspension.

11. Apparatus according to claim 10, said conduits respectively having open ends spaced apart at said central zone by a distance smaller than the diameter of the offtake conduit.

12. Apparatus according to claim 10, said intake conduit extending into an end of said offtake conduit and forming with the latter at said zone venturi means whereby said cooled burned gases flowing from the intake conduit suck said suspension into the offtake conduit.

13. Apparatus according to claim 10, said conduits comprising aluminum pipes respectively encompassed by fluid-tight aluminum jackets and means for continuously circulating a cooling fluid through each of said jackets.

References Cited
UNITED STATES PATENTS

| | | | |
|---|---|---|---|
| 2,750,260 | 6/1956 | Nelson et al. | 23—202 |
| 2,805,131 | 9/1957 | McIntire | 23—277 X |
| 2,980,509 | 4/1961 | Frey | 23—202 |
| 3,086,851 | 4/1963 | Wagner | 23—277 |
| 3,097,073 | 7/1963 | Hildyard et al. | 23—277 |

JOSEPH SCOVRONEK, *Acting Primary Examiner.*

MAURICE A. BRINDISI, JAMES H. TAYMAN, Jr.,
*Examiners.*

E. STERN, *Assistant Examiner.*